Sept. 21, 1926.　　　　　　　　　　　　　　1,600,795
J. M. CAGE
INTERNAL COMBUSTION ENGINE
Filed August 25, 1921　　　8 Sheets-Sheet 3
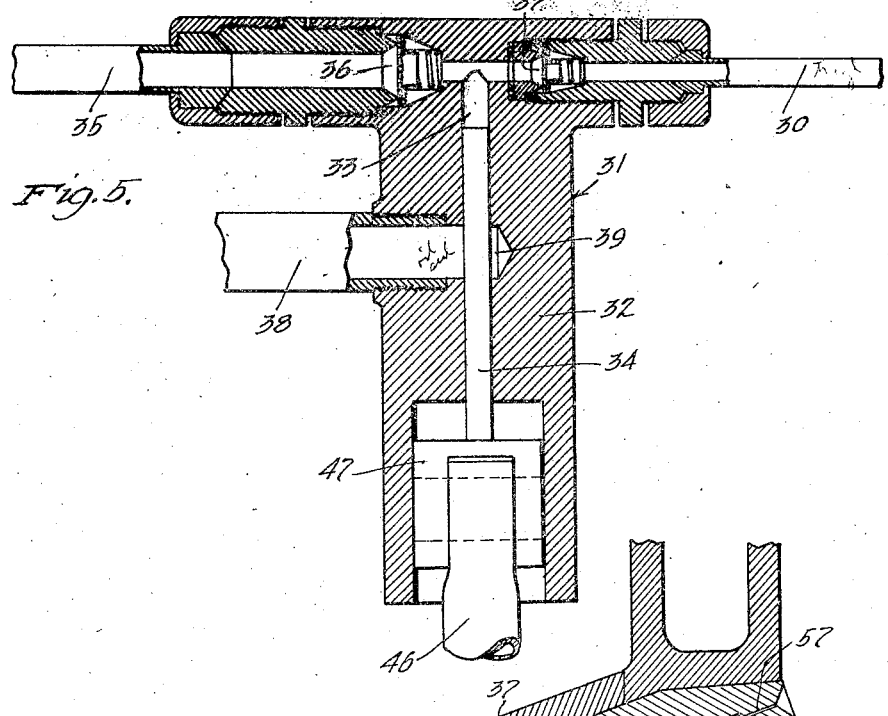
Fig.5.
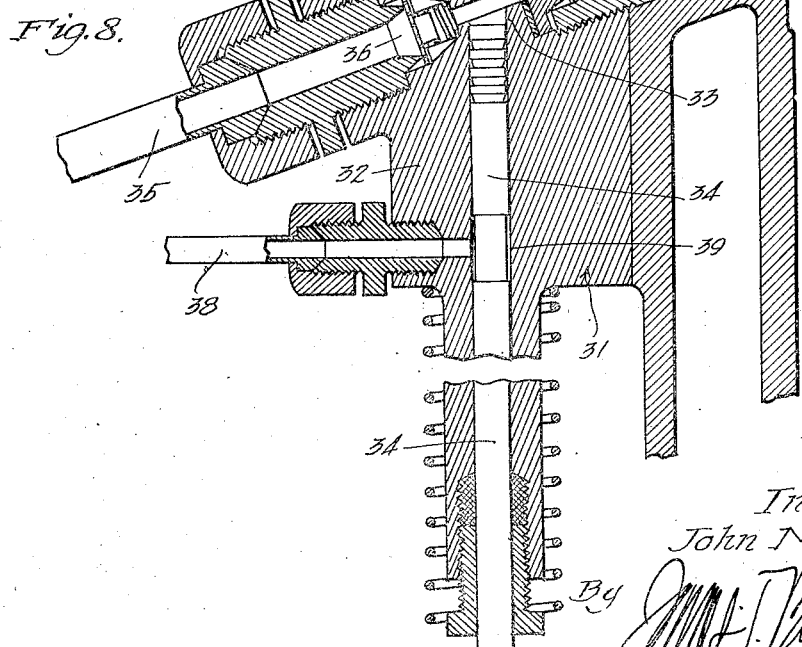
Fig.8.
Inventor,
John M. Cage
By
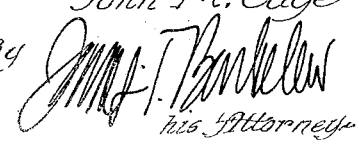
his Attorney Sept. 21, 1926.　　　　　　　　　J. M. CAGE　　　　　　　　　1,600,795
INTERNAL COMBUSTION ENGINE
Filed August 25, 1921　　8 Sheets-Sheet 4
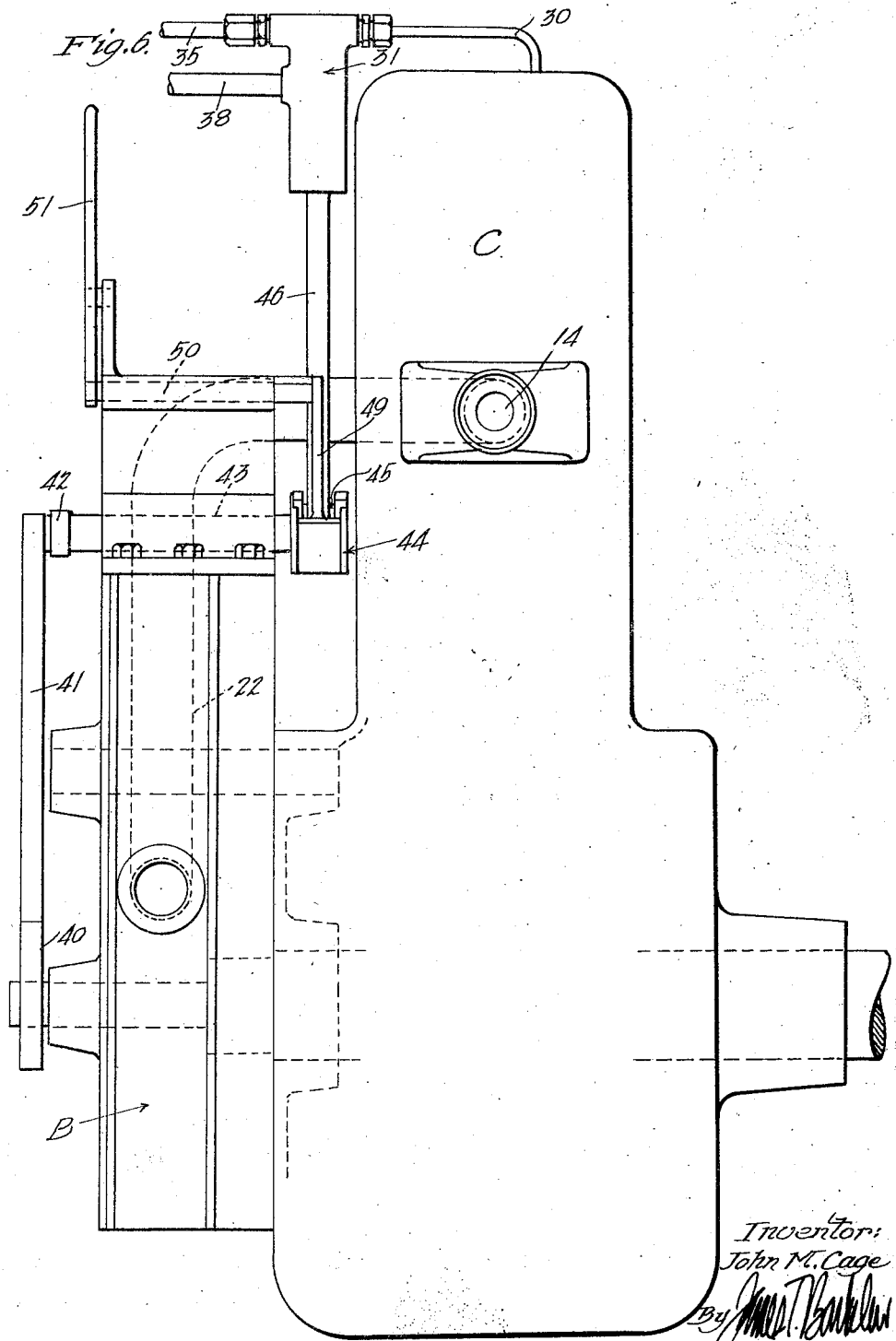

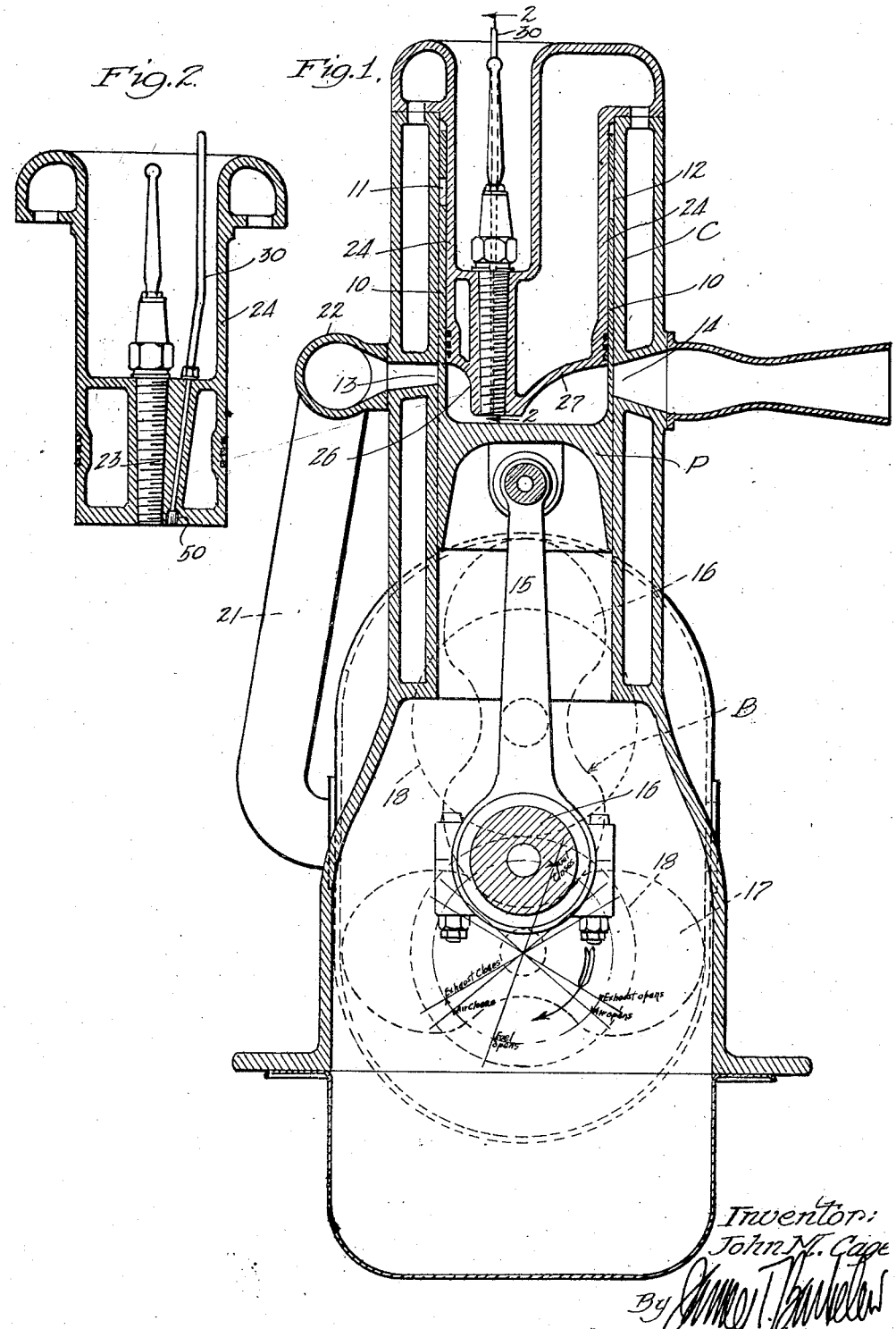

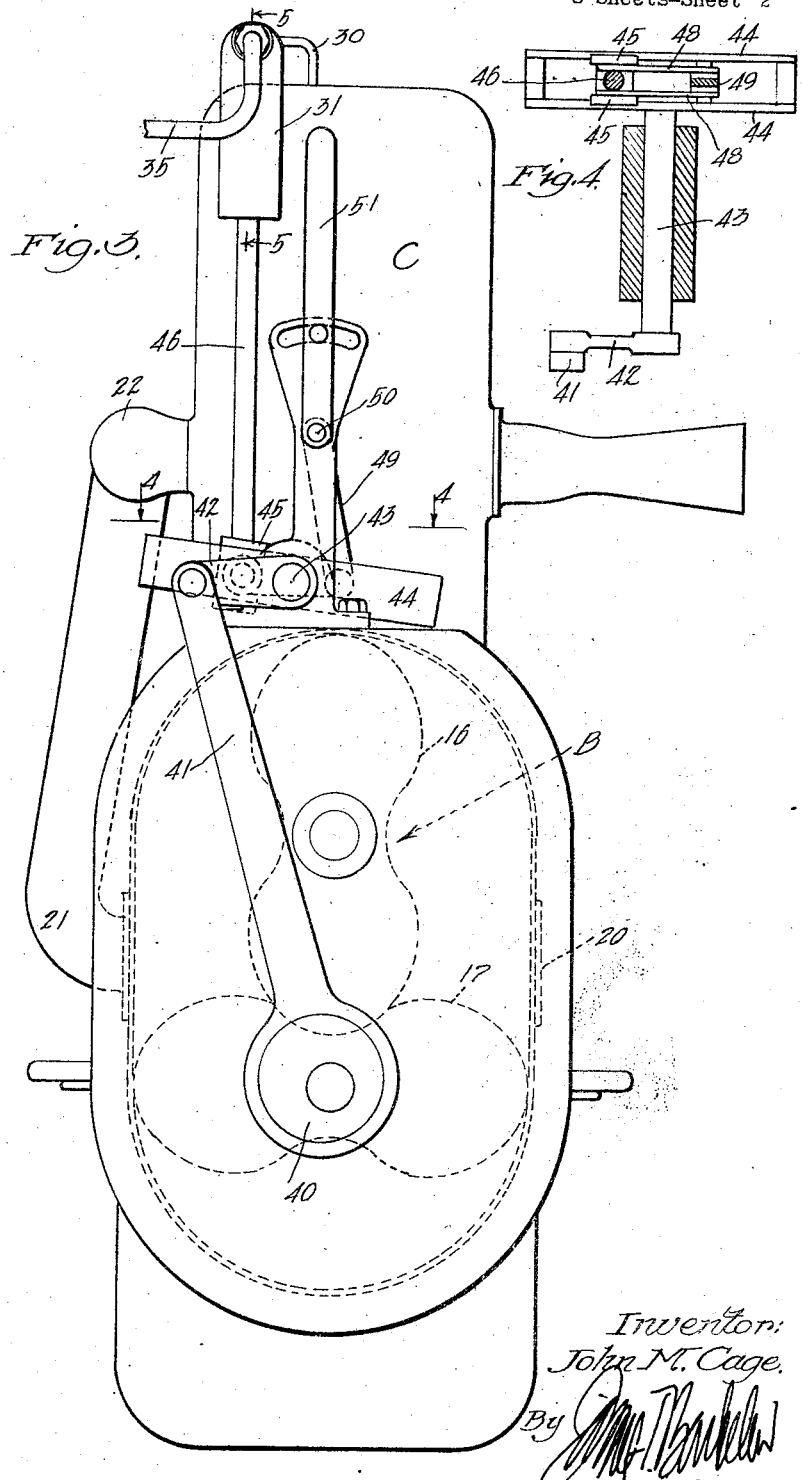

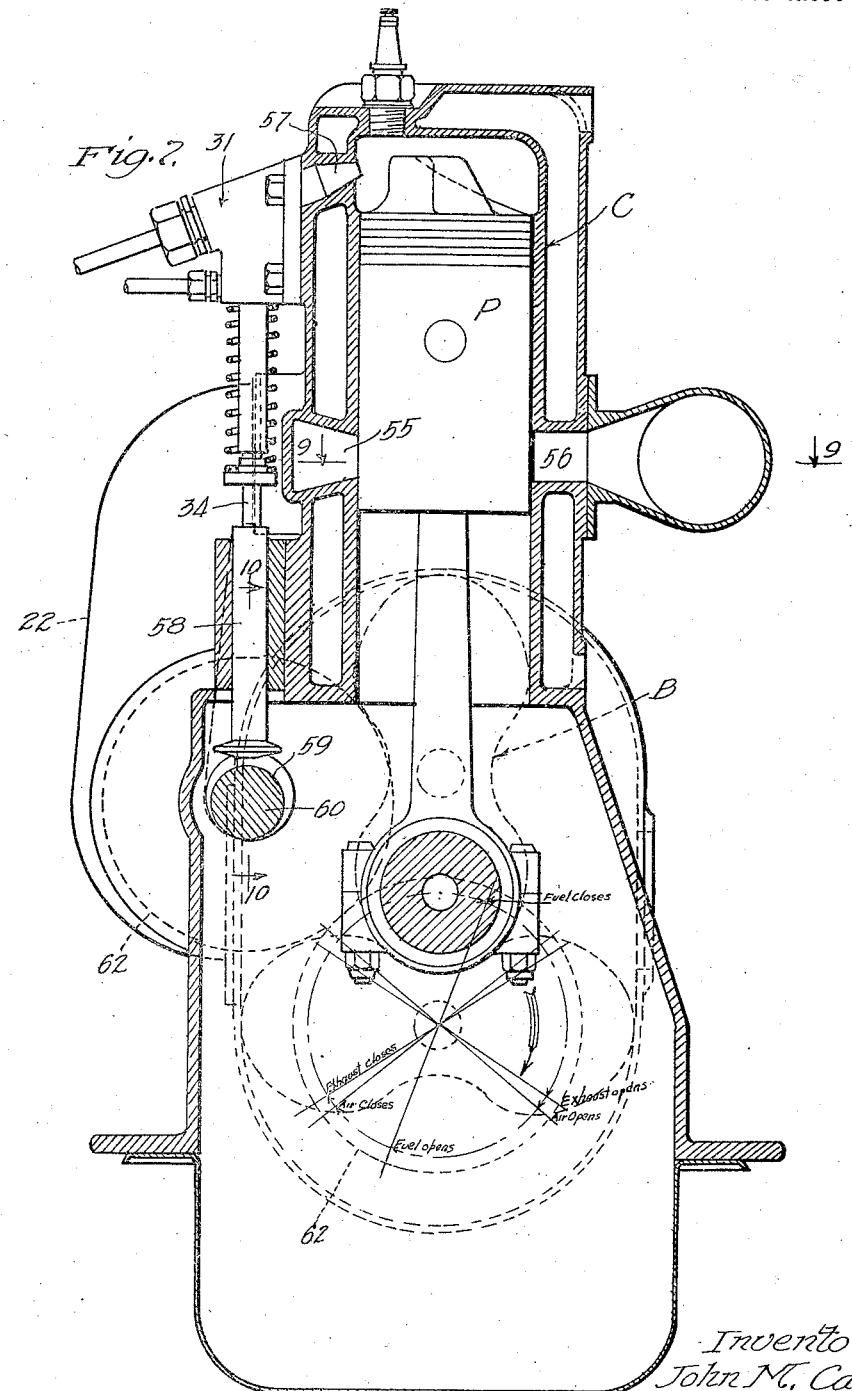

Sept. 21, 1926.
J. M. CAGE
INTERNAL COMBUSTION ENGINE
Filed August 25, 1921
1,600,795
8 Sheets-Sheet 6
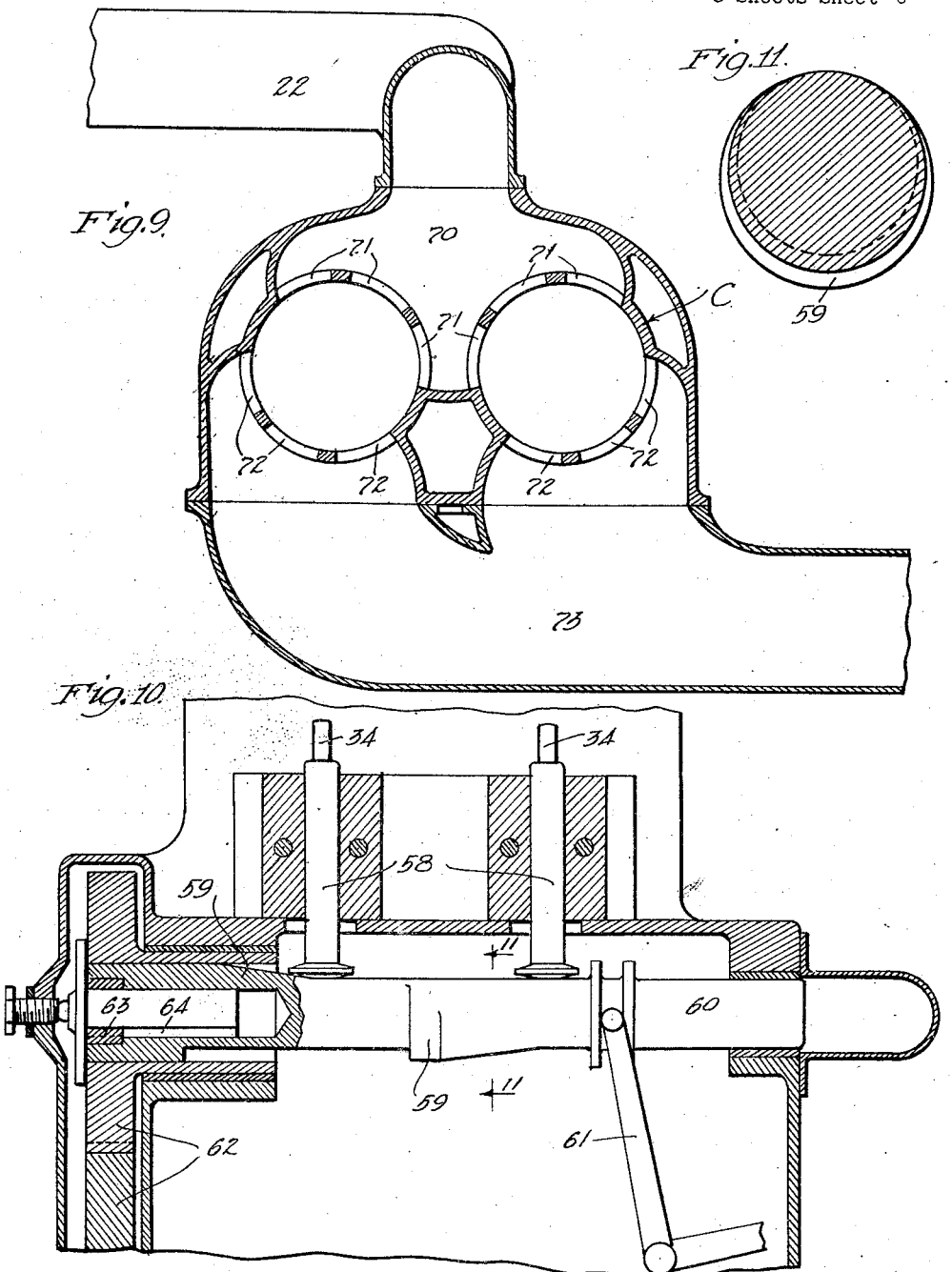

Sept. 21, 1926.                                                    1,600,795
                            J. M. CAGE
                    INTERNAL COMBUSTION ENGINE
                     Filed August 25, 1921        8 Sheets-Sheet 7
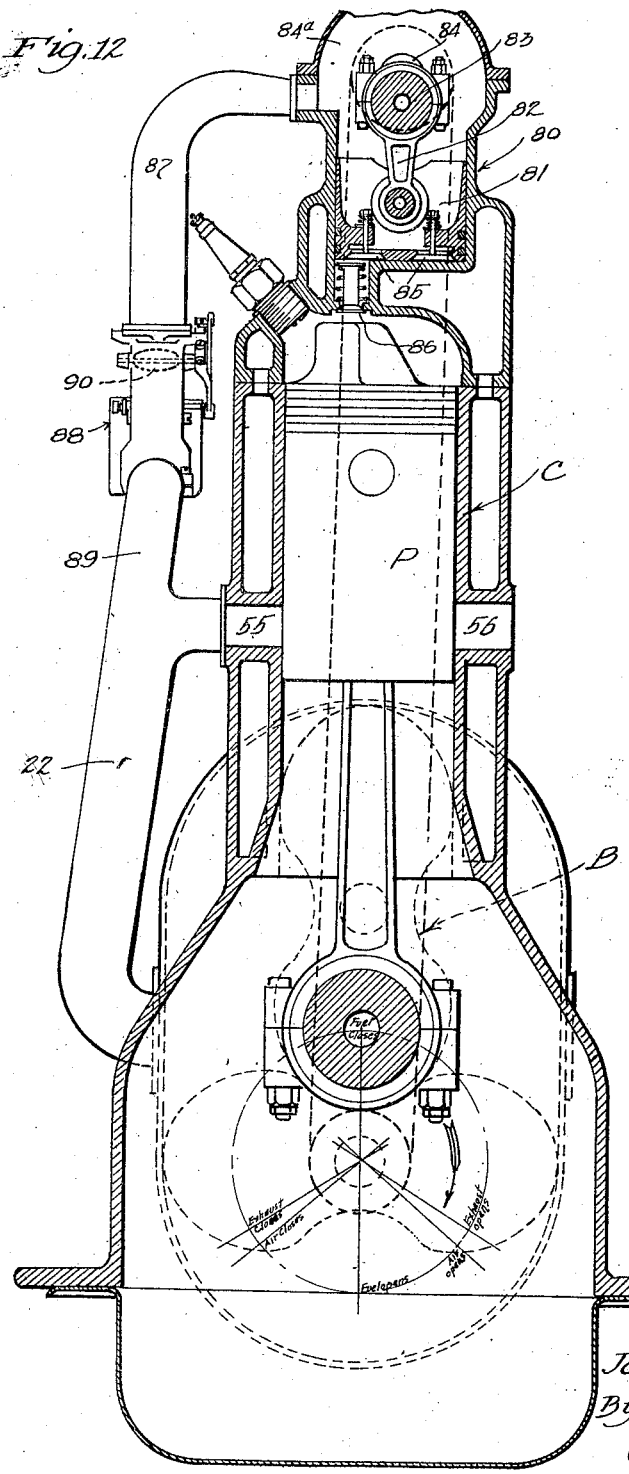

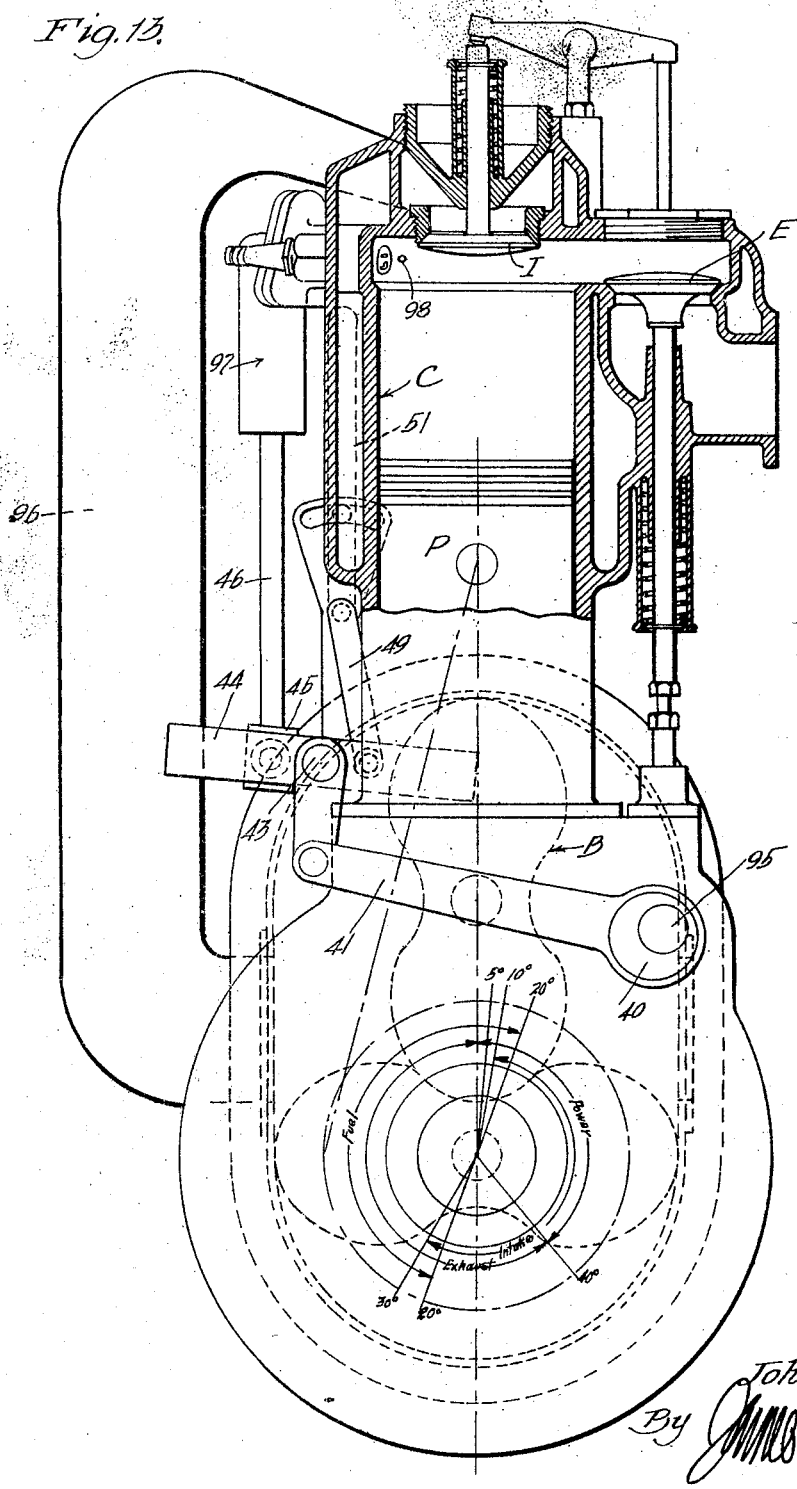

Patented Sept. 21, 1926.

1,600,795

UNITED STATES PATENT OFFICE.

JOHN M. CAGE, OF SANTA MONICA, CALIFORNIA, ASSIGNOR, BY MESNE ASSIGNMENTS, TO HALVOR ANDRESEN, OF CHRISTIANA, NORWAY, AND OLIVER OTIS HOWARD, OF ROCKPORT, MASSACHUSETTS.

INTERNAL-COMBUSTION ENGINE.

Application filed August 25 1921. Serial No. 495,166.

This invention relates generally to internal combustion engines, both of the two-stroke cycle type and the four-stroke cycle type. In the following description relating to the invention, although the major part of the description relates specifically to two-cycle engines; and although the advantageous features of my invention herein set out are most strikingly useful in connection with two-cycle engines; yet it will be remembered that the invention is not, in its broader aspects, limited to two-cycle engines, but that the distinguishing features herein described may be applied with benefit to four-cycle engines.

I have set out, in my application on "internal combustion engine and supplying charge thereto," Serial No. 398,329, filed July 23, 1920, how, in internal combustion engines, and particularly in two-cycle engines, there is a very great falling off in efficiency due to the inability under previously known methods of always giving the cylinder a full and proper charge, regardless of engine speed. I have there explained how, by the use of feed pressures (manifold pressure or port pressure) varying functionally with variation of engine speed, I am enabled to introduce to the engine cylinder, at each intake stroke, regardless of the speed of operation, a full and proper charge. And I have set forth in this application certain typical mechanisms for accomplishing such operation.

The arrangement set forth in such application concerns itself mainly with an engine mechanism wherein the charge is introduced as a carbureted charge. The claims in that application run broadly to the means for introducing a charge, whether that charge be an air charge, or a carbureted charge, in equal amounts, regardless of speed of engine operation. The present application has to do generally with the combination of this system, that I denote shortly, a system of "equable charging", together with means for positive introduction of the fuel, either by direct injection of fuel in liquid form, or by positive pressure introduction of a measured quantity of fuel mixed with a certain quantity of air. This combination has certain advantages, as will be recognized from the following specification. Among those advantages I may preliminarily mention that, particularly in a two-cycle engine, there is always danger of a loss of a certain amount of fuel through the open exhaust port, if the fuel is introduced in proper quantity to completely fill the cylinder with a carbureted mixture of proper proportion; and if the exhaust port is kept open during the charging of the cylinder. In the scavenging of a two-cycle engine it is desirable first to scavenge the cylinder with a charge of pure air; and then to charge the cylinder with the combustible charge. If the exhaust port is closed by the time the combustible charge is introduced, then "super-charging" occurs, that is, the pressure in the cylinder, at the beginning of the compression stroke, is higher than it would otherwise be. I deem it advantageous to avoid super-charging, as I have found that the pressure of super-charge, and the consequent pressure of compression at the end of the compression stroke, varies greatly; and as it is a generally desirable object to avoid such variation. With the combination of my "equable charging" system and the system of positive introduction of the fuel, it will be seen that the cylinder can at all times, regardless of variation of engine speed, be charged with a certain predetermined quantity of air. An excess quantity of that air may or may not flow through the open exhaust port; but at the beginning of the compression stroke, there will always be in the cylinder a certain fixed quantity of air to be used as the air component of the subsequent charge. Then, during the compression stroke, the fuel may be positively introduced by suitable means.

There are a great many variations and modifications, of which my invention is susceptible; and there are a great many objects, and corresponding accomplishments of the invention; but all of these will be best understood from the following detailed description of typical forms which embodiments of the invention may take: reference for this purpose being had to the accompanying drawings in which:—

Fig. 1 is a vertical cross-section showing an engine of the fuel injection type, and embodying my invention; Fig. 2 is a detail section taken as indicated by line 2—2 on Fig. 1; Fig. 3 is an end elevation of the same engine; Fig. 4 is a detail section taken as indicated by line 4—4 on Fig. 3, showing a type of fuel injection pump control that may be used; Fig. 5 is an enlarged detail taken on line 5—5 of Fig. 3; Fig. 6 is a side elevation of the same engine; Fig. 7 is a vertical cross-section showing another type of engine wherein the fuel injection pump may be operated by cam means; Fig. 8 is an enlarged detail section showing the pump and fuel injection nozzle of the engine shown in Fig. 7; Fig. 9 is a horizontal cross-section taken as indicated by line 9—9 on Fig. 7, showing the relative arrangement formations of the intake and exhaust port for a pair of cylinders, built as a unit; Fig. 10 is a detailed section taken as indicated by a line 10—10 on Fig. 7, showing the control means for the cams that actuate the fuel pump; Fig. 11 is an enlarged detail section taken on line 11—11 of Fig. 10; Fig. 12 is a vertical cross-section of an engine which embodies in its make-up a means for positive introduction of a rich carbureted charge instead of a liquid fuel as in the engines of the previous figures; and Fig. 13 is a vertical cross-section, showing a type of construction that may be used for a four-cycle engine.

Referring first to the mechanism that is shown in Figs. 1 to 5, it will be seen that therein I have shown an engine having a water-jacketed cylinder C in which a piston P is adapted to reciprocate, this piston having, preferably integral therewith, and extending upwardly from its upper end, a sleeve valve 10 provided with inlet port 11 and exhaust port 12 that are adapted to register, respectively, with cylinder inlet port 13 and cylinder exhaust port 14. The piston P is connected by the connecting rod 15 with crank pin 16 of the crank shaft; and this crank shaft drives (specifically shown as a direct drive in these drawings) a blower B which is illustrated as of the lobe type, embodying two vanes 16 and 17, one of which may be mounted directly on the engine shaft, and the other driven by means of gears 18 from the engine shaft. In practical operation, such a blower of the type herein described, when operated at comparatively high speed, raises a pressure which is substantially proportionate to the square of the speed of operation. If such a blower were absolutely tight and had no leakage whatever, its output would be at low speeds proportional to the speed of operation; but there is always a certain amount of leakage in such a blower; and furthermore such leakage, or release of the pressure, may be specifically arranged for, so that the pressure raised by such a blower, particularly when operated at high speeds as it is here, may be made to conform to the proportions herein stated. Such a blower is of course, and particularly when operated at comparatively low speed, of the impulse type—its pressure is not constant. But the pressure raised by the blower may be averaged by making the intake manifold of large enough size to reduce the amount of variation during each revolution of the engine shaft; or the variations may be taken care of, and a more or less constant pressure maintained at the intake port, by such compensating means as I have explained in my said prior application. And further, the blower may be arranged in such relative position, with relation to the reciprocation of the piston, as to reach its highest and lowest pressures at times to suit, and synchronize with, the openings and closings of the inlet port, and with the flow of the charge into and through the cylinder. Developments are being made at the present time in such synchronization of the blower or other pressure ranging means; but, for the purposes of this application, as broadly considered, such developments need not be here introduced. It is only necessary here to state that this blower, or any other suitable means, may be used for raising a pressure on the charge, and deliver a pressure into the manifold or at the intake port, substantially proportional to the resistance to flow of the charge; which resistance to flow is substantially proportional to the square of the speed of engine operation.

In the present instance the charge compressed by the blower is a charge of air only, the blower intake being at 20 and its outlet at 21 through the pipe leading to the intake manifold 22. In the type of engine here shown, the fuel is introduced into the cylinder at a point shown to be near the spark plug 23. The spark plug 23 is located in a head 24 that extends down inside the upper end of the cylinder, leaving room for the sleeve 10 to work betwen this head and the cylinder wall. The ports 13 and 14 are directly at the under edge of the head, and the head has curved directing surfaces 26 and 27, the first mentioned of which is adapted to direct the inflowing charge of air downwardly through the combustion space and onto the top of piston P, and surface 27 being adapted to direct the outflowing charge to the exhaust port 14; at times when these ports 13 and 14 are opened by registration with ports 11 and 12. The fuel may be introduced through a fuel induction pipe 30 which comes from a fuel pump 31, shown in detail in Fig. 5, and whose operating mechanism is best shown in Figs. 3, 4 and 6. This pump may comprise a suitable body 32 with a plunger bore 33 and a plunger 34 reciprocating in that bore, in timed relation with the operation of the engine, as will be hereinafter explained, and also with a variable stroke, as will be hereinafter explained. The fuel intake to the pump is through a fuel pipe 35, past an inwardly opening check-valve 36 into the upper end of the bore 33. By the upward movement of plunger 34 the fuel is forced out through the outwardly opening check-valve 37 into and through the pipe 30 that leads to the engine cylinder. Leakage or escape of fuel past the plunger 34 is prevented by an oil seal in the chamber 39, surrounding the plunger; the oil being supplied to the chamber through a pipe 38, and maintained at a higher pressure than that of the fuel in pipes 30 and 35. The chamber 39 is so positioned as to be below the top of the plunger 34 when in its lowermost position. Heavy lubricating oil is preferably used.

The pump plunger is driven by any suitable mechanism, as for instance, that illustrated in Figs. 3, 4 and 6. An eccentric 40 on the engine shaft may drive an eccentric arm 41 to drive a rocker arm 42. This rocker arm 42 is mounted on a rock shaft 43 which carries at its opposite end a transverse slider 44 which rocks with the shaft. A block 45 is adapted to slide longitudinally of the rocker 44; and to this block 45 the lower end of the plunger connecting rod 46 is pivoted, the upper end of this piston rod being pivoted in a slide guide 47 attached to the lower end of plunger 34, as shown in Fig. 5. A pair of links 48 is also pivoted to the block 45, and the other ends of these links 48 are connected to the lower end of an arm 49 that is mounted on a small shaft 50 carrying a hand lever 51. Movement of the hand lever 51 will slide the block 45 along rocker 44 and thus, the rocker 44, rocking always through a fixed angle of oscillation, decrease or increase the amount of motion imparted to the connecting rod 46 and thus decrease or increase the stroke of plunger 34. By such a means as here described, the amount of fuel injected may be varied. It will be understood of course that I have here only outlined a fuel injection means that may be taken to typify mechanisms to accomplish my purpose. The details of fuel injection means, as actually applied to any particular engine, may be worked out to suit that particular engine, its size, its normal speed of operation, etc.; but such details do not play a direct part here in my present invention.

The cycle of operations that I have indicated for this engine, is but a typical one. I have indicated, in the diagram on Fig. 1, that the exhaust may open toward the bottom of the stroke, and then the inlet port (the air port) may open directly after the exhaust opens. In an engine of this design, of course the air and exhaust will close in a symmetrical position after the bottom of the stroke has been passed. It will be readily understood, however, that such an arrangement is only specifically typical of such a design as I herein show with a single, cylindrical valve. In a double-sleeve valve engine, the closures of the intake and exhaust may be placed as desired. Furthermore, I have indicated that the fuel injection begins at a point slightly after the piston reaches the bottom of its stroke, and closes slightly after the piston reaches the top of its stroke. Preferably fuel injection, and the operative stroke of the fuel pump, go on during approximately 180° of crank shaft rotation. This of course, may be arranged as desired, but, generally speaking, in this type of engine I may prefer to carry on the injection of fuel substantially throughout the compression stroke, and, as indicated herein, the injection of fuel may go on somewhat after the piston reaches its uppermost position, so that the injection of fuel then goes on somewhat after ignition has taken place, ignition usually taking place at or before the uppermost position of the piston. In this particular arrangement, it will also be noted that the injection of fuel begins somewhat before the exhaust closes and somewhat before the intake closes. So that, during the first part of fuel injection, in this particular design, the scavenging air charge is still passing into and through the cylinder, while the liquid fuel is being introduced. This, however, is not, broadly speaking, a limitation upon the design.

The capacity of the air charge blower, the capacities of the manifold and the intake port may be such that, at any particular operating speed, and at the intake pressures raised at that operative speed, a larger volume of air will flow through the intake port than the actual capacity of the combustion chamber. In other words, when the exhaust port opens, and the exhaust pressure is relieved, then the charge of scavenging air will immediately begin to flow into and through the cylinder, pressing the burnt gases out ahead of it; and the amount of this charge may, and preferably will, in some cases, be sufficient so that the exhaust gases are not only flowed out through the exhaust port, but a part of this air charge is also flowed out through the exhaust port. This excess of flow through the cylinder is particularly the subject matter of another application, internal combustion engine, filed on even date herewith, Ser. No. 495,167. Its advantages are that it more thoroughly cleanses the cylinder of any remnants of burnt gas that might otherwise remain therein, intermingled somewhat with the inflowing charge of air; and also that, in passing through and out of the cylinder, this excess of air has the action of carrying away a certain amount of the cylinder heat. This action thus cools the inner cylinder walls, which are the parts of the cylinder most difficult to cool, particularly in a sleeve valve engine, and further particularly in a two-cycle engine. Thus, and regardless of whether there is a flow through the cylinder of an excess quantity of air, when the introduction of fuel begins, the cylinder is either completely clean of burnt gases or substantially clean of them. If the fuel injection is begun during the flow of air this flow helps in the distribution of the liquid fuel throughout the cylinder. Otherwise, if the introduction of fuel is begun after, or substantially at the time that the exhaust valve closes, and the flow of air through or into the cylinder has ceased, the distribution of the fuel depends entirely upon the distribution from the fuel nozzle. The nozzle, a simple form of which is indicated at 50 in Fig. 2, may be designed particularly for this purpose; but as many such nozzles have been designed, it is not necessary here to describe in detail any particular form of nozzle. However, in either case, regardless of when the introduction of fuel begins, the introduction of fuel will preferably go on during the compression stroke of the piston; and the movement of the air charge in the compression chamber, during this up-stroke, aids in the distribution of the fuel throughout the air charge; until, when the air charge reaches its maximum compression in the head of the combustion chamber and close to the spark plug, the fuel is distributed throughout the charge, ready for ignition. If the introduction of fuel goes on after ignition, sufficient fuel has been introduced before ignition to form a combustible mixture; and that part which is introduced after ignition is then burned as it is introduced and mingled with the air in the combustion chamber.

Now, it will readily be seen that, with the system of operation, and with the constructions herein illustrated, a uniform charge may be easily introduced into the cylinder, regardless of speed of engine operation. The amount of air remaining in the cylinder at any speed of operation will always be the same; subject of course to throttle control. In the type of engine herein illustrated, throttle control on the air charge may be dispensed with, it thus being designed to introduce always a certain predetermined quantity of air; and the power of the engine being regulated by regulating the amount of fuel introduced on each stroke. Of course, however, throttle regulation of the air charge delivered to the manifold and to the intake port may be used if desired. The amount of charge being constant, regardless of speed of operation, it will also be seen that all possibility of loss of fuel by leakage through the exhaust port, or by leakage past the valves, is completely eliminated. The introduction of fuel, or the major portion of that introduction, goes on after the exhaust port has closed. The ports 11 and 13, and the ports 12 and 14, having been "lapped," there is substantially no opportunity for leakage around or past the sleeve valve through those ports; and, as the compression pressures become greater by the upstroke of the piston, these ports are lapped further and further until, at the point of ignition, and the raising of the combustion charges, the combustion chamber is virtually sealed.

I have said that the blower capacities and pressures may be designed either to put an excess of air through the cylinder or designed to provide substantially just the amount of air required for charging of the cylinder. Also, it will be readily understood that the blower capacities and pressures may be designed in such a manner that, and particularly at the lower speeds of operation and lower power operating conditions, less than enough air be introduced to the cylinder to completely charge it; so as to leave in the cylinder under those conditions a certain amount of burned gas. This may be particularly desirable at low operating speeds or at low power operation.

Referring now more particularly to Figs. 7 to 11, I have therein shown an engine of the two-cycle type with its piston P; acting to directly uncover the intake and exhaust ports 55 and 56; showing that my invention may, generally speaking, be applied to this type of engine. In this type of engine the cycle of events, the openings and closures of the ports and the beginning and ending of the fuel injection, is substantially the same as hereinbefore described; but I here have also illustrated a different type of fuel injection mechanisms. In this type of mechanism the pump is substantially the same as that indicated in Fig. 5; and the details of this pump shown in Fig. 8 are indicated by the same numerals as those of Fig. 5. Here, however, the outlet of the pump goes directly to the fuel injection nozzle 57, which discharges into the upper end of the cylinder C. The fuel pump plungers 34 are, in this case, operated by tappets 58 actuated by cams 59 on a longitudinally sliding cam shaft 60. Any suitable means, as indicated at 61, may be used for sliding the cam shaft longitudinally; and cams 59 are of such shape that, as the cam shaft is moved towards the right in Fig. 10, the cams give the tappets 58 a larger and larger throw, thus increasing the stroke of the pump pressure. However, it will be noted, particularly from Fig. 11, that the cams are, at any point along their length, of such shape that, whether the movement of the tappets be large or small, the total movement in one direction is accomplished (in this particular design) in an angular space of 180°. The method of driving the cam shaft 60 may be any method suitable to allow its longitudinal sliding. For instance, it may be driven through the medium of gears 62 from the crank shaft, at even speed therewith, and a spline 63 in a keyway 64 may allow longitudinal motion of the shaft 60.

The cylinders may be built in pairs, and may be arranged as indicated in Fig. 9. The intake manifold is indicated at 22, and this communicates with a common intake passage 70 in the cylinder passage. The cylinder intake ports 71 may extend around a considerable part of the cylinder, being crossed by suitable webs; and so likewise the cylinder exhaust ports 72 which lead to the exhaust manifolds 73; and the general arrangement of the ports may be such that the intake ports, instead of facing directly outwardly in directions parallel to each other, may face somewhat inwardly convergently toward the intake manifold 22, as is illustrated in the drawings. It will be understood the descriptions and remarks concerning the blower for raising pressure on the air charge also apply to the type of engine shown in Fig. 7.

Referring now more particularly to Fig. 12, I show there an engine of the same general type as shown in Fig. 7, its piston uncovering the intake and exhaust ports 55 and 56; the same type of blower B being used; and the cycle events being substantially the same, with this difference, however, that I here show the possibility of beginning the fuel introduction at or substantially at the bottom near the center closing it at or substantially at the top near the center. Fuel introduction here is in the form of a comparatively rich mixture of liquid fuel or vapor and air introduced by a small pump 80 whose piston 81 is driven by a connecting rod 82 from a crank or eccentric 83 on a shaft 84 that may be driven, in this case at a ratio of 1 to 1, from the main shaft of the engine by any suitable means. This pump receives its mixture into its upper crank case 84ᵃ, the mixture passing through the lower side of the piston 81 through valves 85 in the piston head. The mixture is compressed into the combustion chamber through a mixture intake valve 86. The mixture is fed to the crank case through a suitable passage 87 from a carbureter 88 which carbureter is fed with the air from the manifold 22 by means of a passage 89. The carbureter is thus fed with air under a pressure which varies according to the description hereinbefore given; so that the pump 80 is thus fed, at its intake, with a rich carbureted mixture at a pressure which varies in accordance with its speed of operation, in the manner hereinbefore described. Thus, the pressure varying in accordance with the resistance to flow, the pump always receives a certain predetermined charge on each upstroke of its piston; and on each down stroke of its piston, it compresses the whole of that charge into the combustion chamber, the pump piston having no or practically no clearance at the lower end of its stroke. The control of the amount of mixture, in order to vary it for different speeds of operation of the engine, may be had by the ordinary throttle as indicated at 90; but for any given setting of the throttle, and regardless of the speed of operation of the engine, it will be seen that the cylinder will not only receive a certain predetermined amount of air charge but will also receive a certain predetermined amount of fuel charge, because it is at all times receiving a certain predetermined amount of rich mixture. This rich mixture, flowing into the engine cylinder during substantially the whole of the compression stroke, becomes thoroughly intermingled with the air charge therein. Generally, the remarks hereinbefore made as to the introduction of the fuel charge, and its intermingling with the air charge; and as to the amount and timing of the introduction of air charge, all also apply to this type of engine.

In Fig. 13 I have shown application of the foregoing described ideas to a four-cycle type of engine. Here the piston P is shown in a water cooled cylinder C; the exhaust valve is shown at E and the intake valve is shown at I. Both these valves may preferably be actuated from the cam shaft 95, which, as in ordinary four-cycle engines, operates at ½ engine speed. The details of these operations need not be herein shown or described as they are well understood. The blower, or the air pressure raising means B, discharges through a manifold 96 to the intake valve I; to introduce to the cylinder a charge of air under the pressure and flow conditions which have been hereinbefore dwelt upon. The intake valve I may be open during the period denoted "intake" in the diagram on Fig. 13; being substantially the period during which such intake valves are normally open. The fuel is introduced under pressure by a pump 97 through a nozzle 98 into the cylinder, in substantially the same manner and by the same mechanism as hereinbefore described, this pump being operated by the same type of mechanism as is shown in Fig. 3, and hereinbefore described; the eccentric 40 in this case being mounted upon the cam shaft 95 of the engine. Fuel injection is designed to occur substantially throughout the period of intake and compression or throughout the period of compression only as indicated "fuel" in the diagram in Fig. 13. The exhaust here is indicated to open at a point before the bottom dead center and to remain open until substantially at top dead center, as indicated "exhaust" in the diagram in Fig. 13.

Having described a preferred form of my invention, I claim:—

1. In an internal combustion engine, means for introducing a charge of air to the cylinder intake port under a pressure varying substantially as the resistance to the flow of such charge varies at varying speeds, and means for positively introducing a charge of fuel to the cylinder.

2. In an internal combustion engine, means for introducing a charge of air to the cylinder intake port under a pressure varying substantially as the resistance to the flow of such charge varies at varying speeds, and means for positively introducing a predetermined charge of fuel to the cylinder.

3. In an internal combustion engine, means for introducing a charge of air to the cylinder intake port under a pressure varying substantially as the resistance to the flow of such charge varies at varying speeds, and means to cause a quantity of air to flow through and out of the cylinder in excess of the amount required to fill the cylinder, and means for positively introducing a charge of fuel to the cylinder.

4. In an internal combustion engine, means for introducing a charge of air to the cylinder intake port under a pressure varying substantially as the resistance to the flow of such charge varies at varying speeds, and means for positively introducing a charge of fuel to the cylinder, such introduction of fuel extending through substantially the whole of the engine compression stroke.

5. In an internal combustion engine, means for introducing a charge of air to the cylinder intake port under a pressure varying substantially as the resistance to the flow of such charge varies at varying speeds, and means to cause a quantity of air to flow through and out of the cylinder in excess of the amount required to fill the cylinder, and means for positively introducing a charge of fuel to the cylinder, such introduction of fuel extending through substantially the whole of the engine compression stroke.

6. In an internal combustion engine that compresses a charge of air in the work cylinder during the compression stroke, means for positively introducing a charge of fuel to the work cylinder, said introduction extending through substantially the whole of the engine compression stroke.

7. In an internal combustion engine, means to introduce and cause a flow of air through the cylinder in excess of that required to fill the cylinder, and means to positively introduce a charge of fuel to the cylinder, such introduction of fuel extending through substantially the whole of the engine compression stroke.

8. In an internal combustion engine of the 4-cycle type, means to introduce and cause a charge of air to flow through the cylinder in excess of the amount required to fill the cylinder, and means for positively introducing a charge of fuel during the intake and compression strokes.

9. In an internal combustion engine, means for introducing a charge of air to the cylinder intake port under a pressure varying substantially as the resistance to the flow of such charge varies at varying speeds, and means for positively introducing a charge of fuel in liquid form to the cylinder.

10. In an internal combustion engine, means for introducing a charge of air to the cylinder intake port under a pressure varying substantially as the resistance to the flow of such charge varies at varying speeds, and means to cause a quantity of air to flow through and out of the cylinder in excess of the amount required to fill the cylinder, and means for positively introducing a charge of fuel in liquid form to the cylinder.

11. In an internal combustion engine, means for introducing a charge of air to the cylinder intake port under a pressure varying substantially as the resistance to the flow of such charge varies at varying speeds, and means for positively introducing a charge of fuel in liquid form to the cylinder, such introduction of fuel extending through substantially the whole of the engine compression stroke.

12. In an internal combustion engine, means for introducing a charge of air to the cylinder intake port under a pressure varying substantially as the resistance to the flow of such charge varies at varying speeds, and means to cause a quantity of air to flow through and out of the cylinder in excess of the amount required to fill the cylinder, and means for positively introducing a charge of fuel in liquid form to the cylinder, such introduction of fuel extending through substantially the whole of the engine compression stroke.

13. In an internal combustion engine, means to introduce and cause a flow of air through the cylinder in excess of that required to fill the cylinder, and means to positively introduce a charge of fuel in liquid form to the cylinder, each introduction of fuel extending through substantially the whole of the engine compression stroke.

14. In an internal combustion engine of the 4-cycle type, means to introduce and cause a charge of air to flow through the cylinder in excess of the amount required to fill the cylinder, and means for positively introducing a charge of fuel in liquid form during the intake and compression strokes.

In witness that I claim the foregoing I have hereunto subscribed my name this 19th day of August, 1921.

JOHN M. CAGE.